No. 721,437. PATENTED FEB. 24, 1903.
C. GLOVER.
COASTER BRAKE.
APPLICATION FILED JUNE 24, 1902.
NO MODEL.
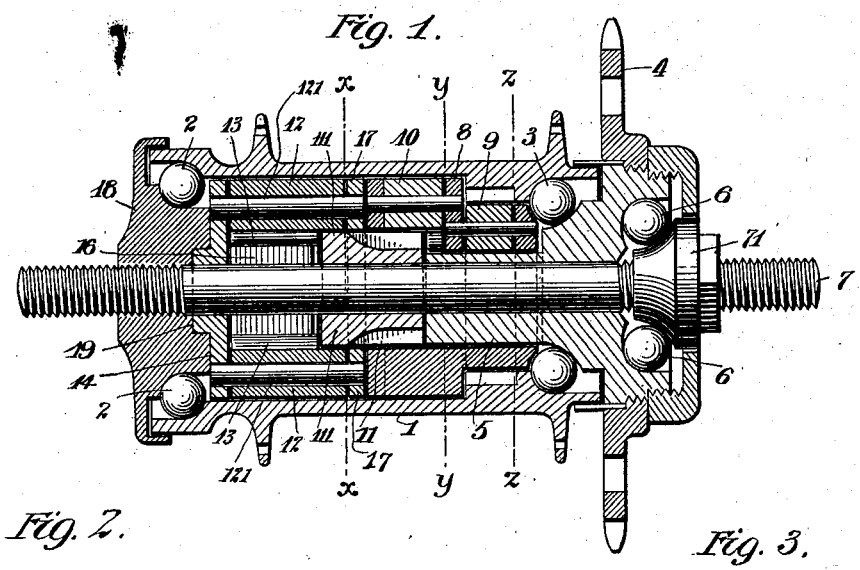
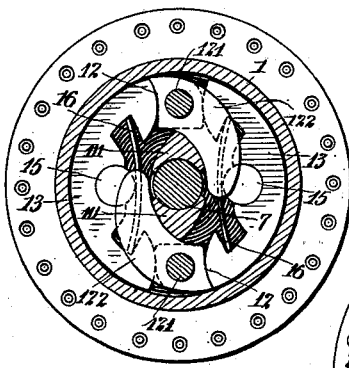
Witnesses
Frank A. Ober
Rob S. Allyn
Inventor:—
Charles Glover,
By his Attorney
R. C. Mitchell.

UNITED STATES PATENT OFFICE.

CHARLES GLOVER, OF NEW BRITAIN, CONNECTICUT.

COASTER-BRAKE.

SPECIFICATION forming part of Letters Patent No. 721,437, dated February 24, 1903.

Application filed June 24, 1902. Serial No. 112,972. (No model.)

*To all whom it may concern:*

Be it known that I, CHARLES GLOVER, a citizen of the United States, residing at New Britain, in the county of Hartford, State of Connecticut, have invented certain new and useful Improvements in Coaster-Brakes and the Like, of which the following is a full, clear, and exact description.

My invention relates to coaster-brakes. It is my purpose to improve the general features of construction by which the element hereinafter termed the "driver" is connected or disconnected with either the hub or the brake-actuator, so that the wheel may be positively propelled or checked or permitted to rotate freely in either direction. The location of the brake is such that the strains are evenly distributed to the wheel-bearings. The arrangement of the parts is such that great compactness is obtained, all the room or space within the wheel-hub being utilized to receive the operating elements without materially enlarging the customary size of the hub. By arranging all of the parts within the wheel-hub they are effectively protected from dust and foreign particles such as tend to impair the effective action of devices of this kind.

In the drawings, Figure 1 is a longitudinal section of the hub of a wheel and the parts constituting my invention. Fig. 2 is a cross-section on the line X X, Fig. 1. Fig. 3 is a cross-section on the line Y Y, Fig. 1. Fig. 4 is a cross-section on the line Z Z, Fig. 1. Figs. 5 and 6 are perspective views of different details of construction. Fig. 7 is an elevation of another detail of construction. Fig. 8 is an end view of the brake-shoes and the support therefor.

1 is a wheel-hub. 2 3 are antrifriction-balls providing bearings for each end of said hub 1.

4 is a gear or sprocket-wheel, which I shall term herein the "driver."

5 is an extension from the driver, that portion of said extension which extends into the hub being preferably in cross-section of angular shape.

6 represents antifriction-balls located between the driver and a cone 71, which is mounted upon the axle 7. A portion of the extension from the driver 4 affords one of the bearing-surfaces upon which the antifriction-balls 3 roll.

8 is a frame carrying pivoted pawls 9 10, which are so arranged that they may alternately engage with the wheel-hub 1 or the brake-actuating mechanism.

11 is a brake-actuator loosely mounted upon the axle 7. The pawls 9 10 preferably have hooked extensions or projections 91 101, which are adapted to alternately engage the inner wall of the wheel-hub 1 and brake-actuator 11, respectively. The hub preferably has teeth adjacent to the pawls 9, and the brake-actuator 11 also preferably has teeth adjacent to pawls 10. The teeth on the hub 1 and on the brake-actuator 11 are best seen in Figs. 4 and 6, respectively. The brake-actuator 11 is provided with extensions 111 111.

12 12 are cams, preferably double-acting, the same being pivotally mounted upon studs 121 121. The studs 121 may be fixed to the supporting-plate 14 hereinafter referred to, or they may be fixed to the cams 12 12, as shown in the detail view. From the cams 12 extend levers 122 122, said levers normally resting against the projections 111 111 on the brake-actuator 11.

13 13 are brake-shoes, the ends of the same bearing against the said cams 12 12.

14 is a supporting-plate having studs 15 15, which fit into notches in the brake-shoes 13 13, so as to prevent the brake-shoes from working around independently of said plate 14.

16 16 are springs, the ends of each spring being received in notches in each of said brake-shoes 13 13, while an intermediate portion of each of said springs bears against studs 15 15 to normally retract and hold said brake-shoes in the position best indicated in Fig. 8, which represents the inactive position.

17 is a washer-plate, the external outline of which is slightly less than the internal diameter of the hub 1. This washer-plate is centrally perforated to permit the passage of that end of the brake-actuator constituting the extensions 111 111. The washer-plate 17 is perforated to receive the end of the studs 121 to hold the same, the opposite end of said studs being held in support 8. The supporting-plate 14, the studs 121, and the plate 17 constitute what I shall term a "brake-supporting frame." As heretofore stated, the studs support the double-acting cams 12. The frame holding the hooked pawls 9 and 10 is capable of limited rotative action independently of the driver extension, which operates to tilt the pawls 9 and 10 into engagement with the hub or the brake-actuator, respectively. This construction is shown and described in detail in my former patent, No. 696,036, and need therefore be only briefly referred to herein.

18 is a block near one end of the axle 7 and locked against rotation in any suitable manner. The block 18 may provide the cone upon which the antifriction-balls 2 run, and it also provides an angular recess, as best seen in sectional view Fig. 1, to receive an extension 19 of the supporting-plate 14. This extension 19, projecting into a recess in the nonrotative member 18, prevents the brake-frame from rotating, and consequently the brake-shoes 13 13 are prevented from rotative movement.

The operation of the parts is substantially as follows: When the driver 4 is turned in a forwardly direction, the extension 5 revolves slightly in frame 8 and tilts the pawls 9, so as to throw the hooks 91 into engagement with the teeth on the hub 1, and then a continued forward movement of the driver 4 will be transmitted through the said pawls to the wheel-hub, which will be positively rotated in a forward direction along with the drum 4. When the rider stops pedaling and the driver 4 is stopped, the pawls 9 are freed from the hub 1. The hub is then entirely disengaged, and if the vehicle is moving it may coast along uninterruptedly. When it is desired to apply the brake, a reverse movement is imparted to the driver 4, whereupon the extension 5 rotates slightly in the frame 8 and is brought to bear against the rear end of the pawls 10, causing the teeth 101 to project into the teeth on the brake-actuator 11. A continued rearward movement of the driver 4 rotates the brake-actuator 11, and the extensions 111, bearing against the levers 122, rock the cams 12, which in turn press the brake-shoes 13 13 apart, causing them to frictionally engage with the inner surface of the hub, offering a resistance to the advance thereof, and consequently checking the same. The degree of resistance depends entirely upon the force imparted to the brake-shoes from the driver 4. The brake may be applied so hard as to entirely stop the hub or so gently as to slightly resist its free movement. To release the brake, a slight advance of the driver 4 retracts the hook from engagement with the brake-actuator, and the brake-shoes return to their normal inactive position under the influence of the springs 16 16.

From the foregoing it will be seen that practically the entire space within the wheel-hub is occupied by the mechanism by which the driver is connected or disconnected with either the wheel-hub or the brake; that the brake-shoes are caused to press against the hub on a line between the antifriction-bearings, so that the strains, which are sometimes very great, will not tend to twist the hub or convey an undue load upon one set of bearings; that the parts are entirely protected from dust; that oil provided for the proper lubrication of the antifriction-bearings aids in the lubrication of the coaster-brake mechanism, and that the necessity of providing movable external parts, with the single exception of the brake-actuator, is entirely avoided. All of the parts are readily removable and in case of wear may be readily replaced by new ones. The pawl-carrying frame and the brake-carrying frame being located end to end tend to support one another. The levers borne by the double-acting cams when retracted are stopped by the axle in its preferred form, and hence cannot swing back so far as to cause a displacement of the brake-actuator or any of the parts coacting therewith. By providing double-acting cams and a pair of brake-shoes the effective movement of the brake-shoes is twice as great as though only single-acting cams were provided. The levers by which the cams are operated are located at the ends of the cams. Hence it is not necessary to project the brake-actuator extensions in between the cams, but merely in between the lever-arms. This feature and others facilitates a compactness of form hitherto unattained.

What I claim is—

1. In a coaster-brake, a wheel-hub, bearings at the ends thereof, a plurality of brake-shoes located within said hub and between said bearings, means for moving said brake-shoes outwardly, a driver, an extension therefrom projecting into said hub, oppositely-arranged pawls operated by said extension, a frame pivotally carrying said pawls said frame having limited rotative movement relatively to said driver extension.

2. In a coaster-brake, a wheel-hub, bearings at the ends thereof, a plurality of brake-shoes located within said hub and between said bearings, means for moving said brake-shoes outwardly comprising cams located between said shoes, projections therefrom, a brake-actuator coöperating with the cam projections, a driver, a driver extension and means for alternately connecting said driver extension with the wheel-hub or said brake-actuator.

3. In a coaster-brake, a wheel-hub, bearings at the ends thereof, a brake-shoe located within said hub and between said bearings, a support for said brake-shoe preventing rotation of said shoe, a cam adjacent to said shoe, an extension from said cam, a brake-actuating device coöperating with said cam extension, a driver, a driver extension and means for alternately coupling said driver extension with said brake-actuator or said hub.

4. In a coaster-brake, a wheel-hub, bearings at the ends thereof, a brake-shoe located within said hub and between said bearings, means to prevent rotary movement of said brake-shoe, a cam on said brake-shoe, a lever-arm extending from said cam, a brake-actuator, an extension from the end of said brake-actuator coöperating with said cam extension, a driving means and mechanism whereby said driving means may be alternately coupled with the wheel-hub or the brake-actuator.

Signed at New Britain, Connecticut, this 20th day of June, 1902.

CHARLES GLOVER.

Witnesses:
C. A. BLAIR,
C. L. IVES.